3,564,086
METHOD OF MAKING A THERMAL SHOCK RESISTANT BERYLLIUM OXIDE COMPOSITE
Susumu Nishigaki and Kazuo Kobayashi, Nagoya, Hiroshige Mizuno, Aichi-ken, and Takehiro Kajihara, Nagoya, Japan, assignors to NGK Insulators, Ltd., Nagoya, Japan, a corporation of Japan
Filed May 18, 1967, Ser. No. 639,578
Int. Cl. C04b 35/08, 35/56, 35/58
U.S. Cl. 264—60                                    1 Claim

ABSTRACT OF THE DISCLOSURE

A method of making a beryllium oxide composite having a multi-phase structure of an oxide polycrystalline phase and a non-oxide crystal phase with a gap or cracks being formed between the two phases and between each oxide polycrystalline phase. This is accomplished by shaping a mixture of 0.5–15% by weight of at least one high melting carbide, boride, or silicide selected from the group consisting of titanium, zironium, niobium, tantalum, chromium, molybdenum, tungsten and vanadium, and silicon carbide the remainder being beryllium oxide, and firing the shaped mixture to 1700° C.

This invention relates to beryllium oxide composites having the most excellent lateral shock resistance as ceramic products.

As heat resistant materials, there have heretofore been known many ceramic materials of oxide, carbide, boride, silicide, nitride, sulfide, graphite and the like systems. Further, in order to overcome the drawbacks of the above materials, thermets, which are such composites as oxide-metal and carbide-metal systems, have also been studied and have been properly used according to their applications. However, these ceramic materials suffer from such common drawbacks that they are weak to thermal stress and are broken due to the thermal stress caused by heat cycle, so that the products thereof are hardly applicable to portions, in particular, which are exposed to severe heat cycle. Further, in applications, the products are markedly restricted in shapes, and it has been necessary to make them uniform in thickness and to prevent the localization of stress on a point.

Of these ceramic materials, quartz glass and graphite are the most excellent in thermal shock resistance. This is ascribable, in the case of quartz glass, to its low thermal expansion coefficient and, in the case of graphite, to its high thermal conductivity. Although these are characteristic materials, they suffer from such drawbacks that quartz glass softens at above 1200° C. and graphite begins to be oxidized at 500–600° C., and thus they are extremely restricted in uses. Therefore, among the conventional ceramic materials, there are no such thermal shock resistant materials as to be usable under any condition at high temperatures up to 2000° C. For example they were entirely unusable in portions which were to be heated to a high temperature, e.g. above 1000° C., and then quickly cooled in water, or which were to be dipped, without preheating, into molten steel at about 1600° C. Beryllium oxide products have been put into various uses by virtue of their high heat resistance, high thermal conductivity and chemical stability. Like the aforesaid materials, however, beryllium oxide products are low in thermal shock resistance, and as a means of settling this question, there have been made various studies to produce composites by adding thereto such additives as metals or carbides, but no excellent products have been obtained yet. One of the causes is that beryllium oxide has such a high melting point as 2550° C. and hence has been fired, at such a high temperature as 1800°–2000° C. in order to obtain a beryllium oxide material. Therefore, in producing a composite, a reaction is caused between beryllium oxide and additive to make it difficult to form a multi-phase structure of oxide phase and non-oxide phase, and in most cases, there is brought about such a state that a solid solution of the additive is formed in the beryllium oxide phase. At the same time, in the crystals of beryllium oxide there takes place extraordinary grain grown with the result that beryllium oxide product is lowered in thermal and mechanical properties to give no excellent beryllium oxide composite. Another cause is considered to be such that the amount of additive is made 20–30% by weight in a sense to utilize the characteristic of the additive as much as possible, which becomes a cause to require the high temperature firing and gives adverse effect to the improvement in thermal shock resistance.

The beryllum oxide composite of the present invention has overcome all of the above-mentioned drawbacks and is a novel composite in which the characteristics of individual ingredients have been fully displayed by the attainment of a composition and a crystal structure which have not been known heretofore. The present beryllium oxide material is excellent in resistance to thermal shock, corrosion, heat and oxidation as compared with any of the above-mentioned conventional composites.

The present invention is based on the finding that when a specific super-refractory is added to beryllium oxide and the mixture is fired at a relatively low temperature, there is formed a multi-phase structure more complete than that of any conventional composite to make it possible to obtain a composite so excellent in thermal shock resistance as not to be expectable from the conventional composites. The present invention is further based on the finding that in addition to the specific super-refractory, a high melting metal or oxide or both thereof are further added to beryllium oxide to obtain a composite more excellent in characteristics than the composite obtained by addition of only the super-refractory.

An object of the present invention is to provide beryllium oxide composite having such characteristics as mentioned above and a method of producing the same.

Other objects will be easily understandable from the descriptions that follow.

The method of producing the beryllium oxide composites in accordance with the present invention comprises preparing a mixture of starting materials consisting essentially of 0.5–15% by weight of at least one super-refractory (hereinafter referred to as "the first additive") selected from the group consisting of high melting carbides, borides and silicides, and the remainder of beryllium oxide, shaping the mixture and firing the shaped mixture to a temperature of 1700° C.

Further, the method of producing more preferable beryllium oxide composites in accordance with the present invention comprises preparing a mixture of starting materials consisting essentially of the first additive, 0.5–15% by weight of at least one high melting metal or oxide (hereinafter referred to as "the second additive"), the sum of said first and second additives being 1–20% by weight, and the remainder of beryllium oxide, shaping the mixture and firing the shaped mixture to a temperature up to 1700° C. The first additive is markedly effective for the improvement of thermal shock resistance, and the second additive serves to further increase the corrosion resistance of the matrix beryllium oxide itself and the thermal shock resistance and oxidation resistance of the resulting composite, as well as to lower the firing temperature to facilitate the firing of the mixture.

The beryllium oxide composite obtained according to the method of the present invention is a thermal shock resistant beryllium oxide composite having a multi-phase structure of an oxide crystal phase and a non-oxide crystal phase which comprises 0.5–15% by weight of at least one member (the first additive). Selected from the group consisting of high melting carbides, borides and silicides and the remainder of beryllium oxide.

Further, the beryllium oxide composite according to the method of the present invention is a thermal shock resistant beryllium oxide composite having a multi-phase structure of an oxide crystal phase and a non-oxide crystal phase which comprises 0.5–15% of at least one member (the first additive) selected from the group consisting of high melting carbides, borides and silicides, 0.5–15% by weight of at least one high melting metal or oxide or both (the second additive), the sum of said first and second additives being 1–20% by weight, and the remainder is beryllium oxide as a main ingredient.

The composition of the beryllium oxide composite in accordance with the present invention which shows properties so excellent as not to be comparable with the conventional composites and the effects of the first and second additives which give such compositions will be detailed below.

In the first place, it is considered to be a main cause for the attainment of the excellent properties of the composite according to the present invention that in the composition comprising beryllium oxide, at least one of high melting carbide, boride and silicide, the grain boundary of an oxide crystal phase comprising beryllium oxide and a non-oxide crystal phase comprising at least one of carbide, boride and silicide plays a specific role. Factors therefor, which may be thought of, will be enumerated below.

(1) Since the sintering temperature is lower than that in the conventional process, beryllium oxide crystals do not grow and a fine tissue structure can be formed. Beryllium oxide particles and additive particles interfere with each other to inhibit the crystal growth, with the result that the mechanical strength is increased and the thermal shock resistance is made high.

(2) A thin intermediary phase is formed between the oxide crystal phase and the non-oxide crystal phase which enhances the bonding strength of the two crystal phases or serves as a lubricant to alleviate thermal shock.

(3) Ordinarily, sintering is difficult when the first additive corresponding to the non-oxide crystal phase is added. In the present invention, however, the amount of the first additive added is small and the influence of the first additive on the sintering is less, with the result that a dense body is obtainable by sintering at below 1700° C.

(4) Only a partial reaction takes place between the oxide phase and the non-oxide phase and therefore a slight gap is formed between the two phases to play the role of shock alleviation as well as to enhance the thermal shock resistance.

(5) Since the present composite has a multi-phase structure, the characteristics of individual phases are displayed particularly in resistance to corrosion and oxidation.

Therefore, the carbides, borides and silicides suitable for use in the present invention are required to have high melting point and chemically stable, and thus include silicon carbide, and carbides, borides and silicides of titanium, zirconium, niobium, tantalum, chromium, molybdenum, tungsten and vanadium. According to the results of experiments, all the above compounds gave favorable results. Every one of these super-refractories has a melting point of about 2000° C. or higher, is chemically stable and scarcely reacts with beryllium oxide up to such a high temperature as 1700° C. The amount of such super-refractory to be added is preferably 0.5–15% by weight. In case the amount is less than 0.5% by weight, the effect of addition of the refractory is little. In case the amount is more than 15% by weight, it is difficult to give a dense body unless the firing is carried out at above 1700° C., and no specific effects of the present invention can be expected.

Generally, in the case where the sintering has been effected at above 1700° C., the characteristics of the product is greatly lowered, though there is a tendency that the sintering temperature increases if an additive of a non-oxide system is added to beryllium oxide.

In the present invention, therefore, a composite having excellent properties which has not been known heretofore can be obtained by adding 0.5–15% by weight of the aforesaid refractory to beryllium oxide and firing the mixture to a temperature of 1700° C.

In the next place, the main object of addition of the second additive is to lower the firing temperature of the composite and to increase the corrosion resistance thereof. In addition thereto, a further effect can be attained in thermal shock resistance, as well. Such second additives are also required to make melting point high. Preferable metal additives are tungsten, molybdenum, tantalum, niobium, chromium and zirconium. These metals scarcely react with beryllium oxide at the time of firing and are in a state dispersed in the form of metals in the fired bodies even after beryllium oxide has been formed in the composites. It has been found that these metal additives further improve the thermal shock resistance of the composites and increase, beyond expectation, the resistance thereof to corrosion and oxidation. On the other hand, as oxide additives, those which react with beryllium oxide to form solid solutions or compounds are suitable. Preferable oxide additives are oxides of aluminum, magnesium, chromium, calcium, zirconium, strontium, titanium, silicon and iron which are of high melting temperature. The effects of addition of these oxides are as follows:

Beryllium oxide, employed as the matrix, is high in corrosion resistance to a molten metal, but is low to a molten slag and a reaction takes place at 1600° C. In case the above drawback is overcome and the beryllium oxide itself comes to have higher corrosion resistance, a further increase in corrosion resistance of the resulting composite material can be expected. As the result of experiments, it was found that when beryllium oxide was incorporated with a small amount of another kind of element capable of forming a solid solution therewith, the beryllium oxide was improved in corrosion resistance, due probably to the formation of crystal strains. Based on the above finding, the present invention has succeeded in improving chiefly corrosion resistance of the beryllium oxide composites by adding to beryllium oxide the aforesaid oxides which can form solid solutions or compounds with the beryllium oxide. Further, the addition of such oxide is most effective to lower the firing temperature of the composite. The firing temperature is lowered by 100°–300° C., with the result that the effects of low temperature firing in accordance with the present invention can be made greater. At the time of addition, the oxide is not always required to be in the form of a powder, but the same effects can be attained even when the oxide is added in the form of a salt capable of being thermally decomposed at an elevated temperature to give the required oxide.

The amount of the second additive to be added should be at least 0.5%, by weight, but the addition thereof in an amount more than 15% by weight is not preferable, for the resulting composite, is lowered in melting point in the case of oxide and is lowered in oxidation resistance in the case of metal.

If only the above oxide or metal is independently added to beryllium oxide, the resulting composite is not only low in thermal shock resistance but also insufficient in corrosion resistance and is not suitable for practical use. Therefore, the oxide or metal should be added in combination with the aforesaid super-refractory. The combination use of said three members results in the most effective improvement in corrosion resistance.

In the present invention, in case the first additive is added together with the second additive, the total amount of the two is within the range of 1–20% by weight. If the amount of the beryllium oxide matrix is at least 80% by weight, the characteristics of the resulting composite is lowered either in oxidation resistance or in heat resistance.

Recently developed active beryllium oxide can give a dense body, when fired at 1300° C. It has been clarified that in firing together with the first additive, or with the first and second additives, the use of said active beryllium oxide results in such advantages, as compared with the case where the aforesaid ordinary beryllium oxide powder is used, that the firing can be effected at a low temperature, and be easily controlled and that the resulting body is further increased in thermal shock resistance, corrosion resistance and mechanical strength.

As mentioned above, the present invention is based on the finding that a beryllium oxide composite prepared under specific conditions, has markedly excellent thermal shock resistance. This composite is withstandable to severe thermal cycle, and is high in mechanical strength and corrosion resistance. The composite further has a melting point above 2000° C. and is strong to oxidation. Unlike the conventional products, the present composites find a wide scope of uses such as, for example, nozzles of rockets, gas turbine blades, materials for metallurgy and ceramic industry, e.g. protective pipes, crucibles and nozzles, refractory materials for nuclear use, e.g. moderators and fuel elements, and refractory materials for MHD power generation. The composite of the present invention should suitably be selected according to applications. For applications where only thermal shock resistance is required, it is sufficient to employ composites comprising beryllium oxide and the first additive, in combination. However, for applications where corrosion resistance to molten steel and molten slag, like in the steel making industry, it is suitable to employ composites comprising beryllium oxide, the first additive and the second additive, in combination. As refractories for nuclear use, these composites may directly be employed as reflectors or moderators, or may be applied onto the surfaces of ceramic fuels or may be mixed with fuel materials, formed and fired to obtain fuel elements excellent in thermal shock resistance.

EXAMPLE 1

20 g. of beryllium oxide powder, each of the additives shown in Table 1 and 4 cc. of water, were thoroughly mixed together. Using a mold, the thus obtained mixture was cold pressed under a pressure of 0.5 ton/cm.$^2$ (500 kg./cm.$^2$) to obtain each 5 pieces of square rods of, 6 x 4 x 30 mm. After drying, the rods were fired in an argon atmosphere under the conditions as shown in Table 1. After heating at 1000° C., the rods were quickly taken out and were quickly quenched in water. The above operation was repeated to investigate the change in bending strength of the rods against water quenching shock cycle. The bending test was done by means of three points-support method specified in ASTM C133–377.

TABLE 1

| Additive | Amount (wt. percent) | Firing temperature (° C.) |
| --- | --- | --- |
| Tantalum silicide | 10 | 1,700 |
| Titanium silicide | 10 | 1,700 |
| Niobium silicide | 10 | 1,700 |
| Silicon carbide | 10 | 1,700 |
| Tantalum silicide | 10 | 1,850 |
| Silicon carbide | 10 | 1,850 |
| None | 0 | 1,700 |

Figure 1:
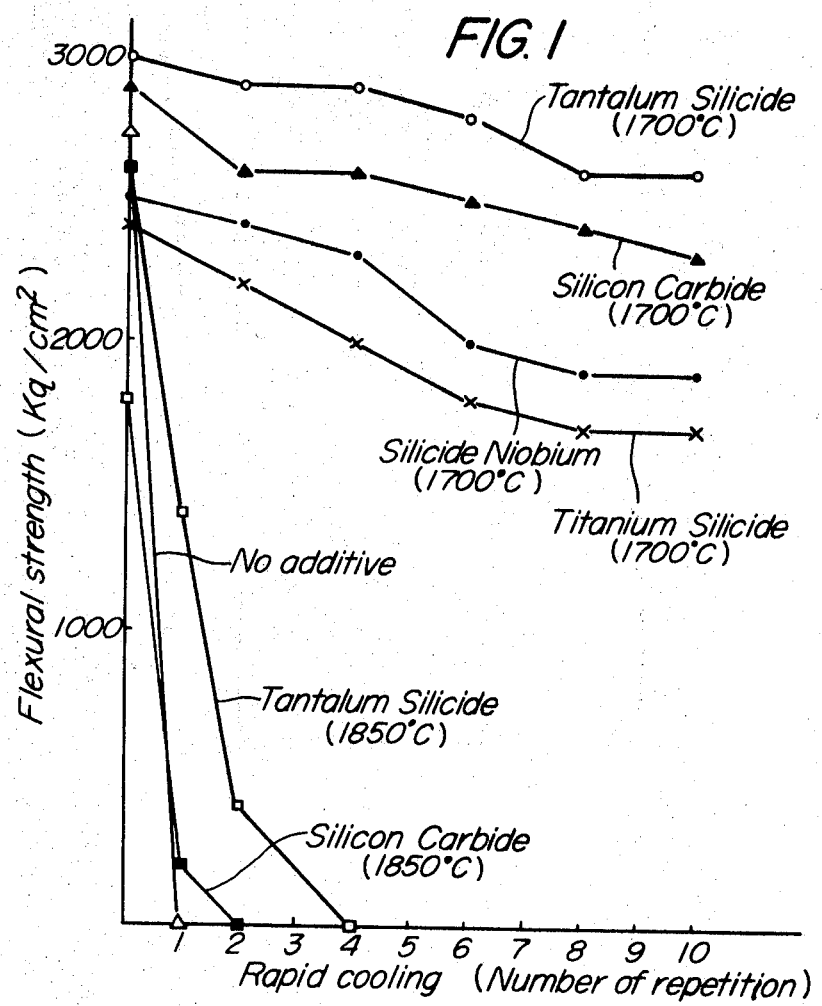
FIG. 1 shows the results of tests in Example 1, indicating by graph the relationship between heat cycles and bending strength values of composites.

Test results were, as shown in FIG. 1, such that even when repeatedly subjected to thermal shock cycle, the rods fired at 1700° C. maintained bending strength values close to 2000 kg./cm.$^2$, though gradual lowering in bending strength was observed, and showed that they were excellent in thermal shock resistance. In contrast thereto, every rod fired at the higher temperature formed cracks when subjected 2–3 times to thermal shock cycle and was quickly lowered in bending strength. From this example, it is possible to know how great influence of the firing at below 1700° C. is on the characteristics of the composite.

EXAMPLE 2

Beryllium oxide powder was mixed with each of the additives of the compositions as shown in Table 2 and 20% of water. 4 g. of each mixture was formed into a plate-like test piece of 17 mm. in diameter and 5 mm. in thickness and was fired. The test piece was placed in an electric furnace under an argon atmosphere. After heating at 1200° C. for about 10 minutes, the test piece was quickly taken out and was quenched in a vessel containing about 20 l. of water to investigate the crack formation of the test piece. The above operation was repeated to judge the thermal shock resistance of the test piece against water quenching. The results, were, as shown in Table 2, such that the ordinary ceramic products such as beryllium oxide, aluminum oxide, magnesium oxide and porcelain, were scarcely bearable against water quenching from a temperature of 1200° C. In contrast to this, the composites of the present invention were withstandable against water quenching repeated 4 or more times, and similar effects were attained by addition of other super-refractories such as carbides, borides and silicides than those shown in Table 2. Of the controls, the glassy carbon is a typical material highly withstandable against water quenching. When compared therewith, it is understood that the composites of the present invention are excellent in thermal shock resistance.

TABLE 2

| Classification | Additives | Amount (wt. percent) | 1 | 2 | 3 | 4 | 5 | 6 | 7 | 8 | Firing temperature) |
|---|---|---|---|---|---|---|---|---|---|---|---|
| Samples of the present invention. | Zirconium boride | 10 | ○ | ○ | ○ | ○ | △ | X | | | ⎫ |
| | Tungsten carbide | 10 | ○ | ○ | ○ | ○ | ○ | △ | X | | ⎬ 1,650° C., vacuum. |
| | Tantalum silicide | 10 | ○ | ○ | ○ | ○ | ○ | △ | X | | ⎪ |
| | Titanium boride plus silicon carbide | 5+5 | ○ | ○ | ○ | ○ | ○ | ○ | △ | X | ⎭ |
| | Tungsten carbide plus silicon oxide | 10+10 | ○ | ○ | ○ | ○ | ○ | △ | X | | ⎫ |
| | Tantalum boride plus silicon oxide | 10+10 | ○ | ○ | ○ | ○ | △ | X | | | ⎪ |
| | Molybdenum boride plus silicon oxide | 10+10 | ○ | ○ | ○ | ○ | ○ | ○ | X | | ⎪ |
| | Molybdenum boride plus zirconium silicide plus silicon oxide | 5+5+10 | ○ | ○ | ○ | ○ | △ | X | | | ⎪ |
| | Chromium carbide plus molybdenum boride plus silicon oxide | 5+5+10 | ○ | ○ | ○ | ○ | ○ | △ | X | | ⎬ 1,600° C., vacuum. |
| | Molybdenum carbide plus chromium silicide plus silicon oxide | 5+5+10 | ○ | ○ | ○ | ○ | △ | X | | | ⎪ |
| | Tantalum carbide plus zirconium | 10+5 | ○ | ○ | ○ | ○ | ○ | ○ | ○ | ○ | ⎪ |
| | Vanadium boride plus zirconium | 10+5 | ○ | ○ | ○ | ○ | ○ | ○ | ○ | △ | ⎪ |
| | Tantalum silicide plus zirconium | 10+5 | ○ | ○ | ○ | ○ | ○ | ○ | ○ | △ | ⎪ |
| | Vanadium carbide plus molybdenum plus chromium oxide | 5+5+10 | ○ | ○ | ○ | ○ | ○ | ○ | ○ | △ | ⎪ |
| | Zirconium boride plus molybdenum plus chromium oxide | 5+5+10 | ○ | ○ | ○ | ○ | ○ | △ | X | | ⎪ |
| | Tantalum silicide plus molybdenum plus chromium oxide | 5+5+10 | ○ | ○ | ○ | ○ | ○ | ○ | △ | X | ⎭ |
| Control | Beryllium oxide (high purity) | 100 | X | | | | | | | | |
| | Aluminum oxide (high purity) | 100 | X | | | | | | | | |
| | Magnesium oxide (high purity) | 100 | X | | | | | | | | |
| | Commercially available sample: | | | | | | | | | | |
| | Ordinary porcelain (commercially available) | | △ | X | | | | | | | |
| | Glass carbon (commercially available) | | ○ | ○ | ○ | △ | X | | | | |
| | Aluminum oxide plus chromium (commercially available) | | ○ | △ | X | | | | | | |

NOTE.—○=No crack formation observed; △=Amplifier-observable cracks formed; X=Visible cracks formed.

EXAMPLE 3

Beryllium oxide powder was mixed with each of the additives of the compositions as shown in Table 3 and 20% of water. 3 g. of each of the thus obtained mixtures was cold pressed by using a mold of 16 mm. in diameter under a pressure of 1.4 ton/cm.² to prepare test pieces. After drying at 100° C. for 12 hours, the test pieces were fired at the maximum temperature for about 1 hour according to the firing method mentioned later.

Figure 2:
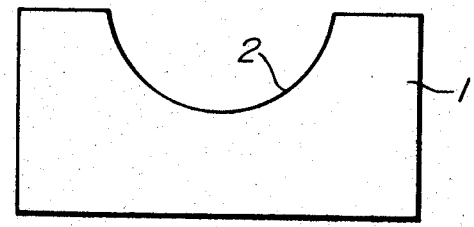
FIG. 2 shows the shape of the corrosion test pellet employed in Example 3.

As controls, test pieces of high purity beryllium oxide, magnesium oxide, aluminum oxide and zirconium oxide were prepared in the same manner as above. Since titanium boride is hardly fired, it was particularly charged in a graphite mold and was subjected to hot press method to prepare a sample thereof. Each of the test pieces was shaped into a corrosion test pellet 1 in the form of a short column of 13 mm. in diameter and 7 mm. in height which had a dent 2 at the center of the upper surface, as shown in FIG. 2. In the dent 2 of each pellet, a small amount of a steel fragment or a synthetic slag (60% calcium oxide, 20% silicon oxide, 10% aluminum oxide and 10% iron oxide) was placed, and the pellet was heated in an electric furnace at 1600° C. for about 30 minutes while flowing an argon gas into the furnace. Thereafter, the pellet was taken out and cut into halves, and the cross-sections thereof were observed with the naked eye to investigate the corrosion state thereof. The results of the corrosion test were as shown in Table 3.

According to the corrosion test, all of the controls, i.e. beryllium oxide, aluminum oxide, magnesium oxide and zirconium oxide, don't show any complete corrosion resistance to molten steel and slag, whereas every sample having the composition in accordance with the present invention shows excellent corrosion resistance. A wide applications of the present composites can be expected in the fields of metallurgy and ceramics. The test pieces incorporated with only a super-refractory was high in firing temperature and was somewhat low in corrosion resistance.

In the next place, the oxidation resistance of test pieces were tested in the following manner: Each of the above pellets was placed in a square-type electric furnace (in air) and was heated at 1200° C. and 1400° C., respectively, for about 2 hours. Thereafter, the pellet was taken out and cut into halves, and the cross-section thereof were observed with the naked eye to investigate the degree of oxidation. Since the oxidation progresses from the surface, the degree of oxidation was judged according to the depth of a discolored layer from the surface. The results of the oxidation test were as shown in Table 3. Titanium boride undergoes vigorous oxidation at such a low temperature as 1200° C., and hence is not usable at higher temperatures. In contrast, the test pieces in accordance with the present invention, particularly, those having the first and second additives, have sufficient oxidation resistance even at such a high temperature as 1400° C.

TABLE 3

| Classification | Additives | Amount (wt. percent) | Corrosion resistance Molten steel | Slag | Oxidation resistance 1,200° C. | 1,400° C. | Firing |
|---|---|---|---|---|---|---|---|
| Test pieces of the present invention. | Zirconium carbide plus magnesium oxide | 5+10 | ○ | △ | ○ | ○ | ⎫ |
| | Silicon carbide plus aluminum oxide | 5+10 | ○ | ○ | ○ | ○ | ⎪ |
| | Titanium boride plus chromium oxide | 5+10 | ○ | ○ | ○ | ○ | ⎬ 1,500° C., vacuum. |
| | Niobium boride plus calcium oxide | 5+10 | △ | ○ | ○ | ○ | ⎪ |
| | Chromium silicide plus strontium oxide | 5+10 | ○ | ○ | ○ | ○ | ⎪ |
| | Tungsten silicide plus zirconium oxide | 5+10 | ○ | ○ | ○ | ○ | ⎭ |
| | Niobium carbide plus tantalum | 5+5 | ○ | △ | ○ | △ | ⎫ |
| | Tantalum carbide plus niobium | 5+5 | ○ | △ | ○ | ○ | ⎪ |
| | Chromium boride plus zirconium | 5+5 | ○ | ○ | ○ | ○ | ⎬ 1,550° C., vacuum. |
| | Molybdenum boride plus molybdenum | 5+5 | ○ | ○ | ○ | △ | ⎪ |
| | Niobium silicide plus tungsten | 5+5 | ○ | △ | ○ | ○ | ⎪ |
| | Vanadium silicide plus molybdenum | 5+5 | ○ | ○ | ○ | ○ | ⎭ |
| | Chromium carbide plus zirconium plus aluminum oxide | 5+5+5 | ○ | ○ | ○ | ○ | ⎫ |
| | Tungsten boride plus tungsten plus titanium oxide | 5+5+5 | ○ | ○ | ○ | △ | ⎬ 1,500° C., argon. |
| | Titanium silicide plus chromium plus iron oxide | 5+5+5 | ○ | ○ | ○ | ○ | ⎭ |
| | Titanium carbide | 10 | △ | ○ | △ | △ | ⎫ 1,650° C., |
| | Titanium silicide | 10 | △ | △ | ○ | △ | ⎭ vacuum. |
| Control | Pure oxide system: | | | | | | |
| | Beryllium oxide (high purity) | 100 | △ | X | | | ⎫ |
| | Aluminum oxide (high purity) | 100 | X | X | | | ⎬ 1,600° C., hydrogen. |
| | Magnesium oxide (high purity) | 100 | △ | △ | | | ⎪ |
| | Zirconium oxide | 100 | △ | X | | | ⎭ |
| | Super-refractory system: titanium boride | 100 | ○ | △ | X | X | 1,800° C., hot press. |

NOTE.—In the column Corrosion resistance: ○=No reaction nor discoloration observed; △=More or less discolored portion observed; X=Discolored portion observd over a wide scope.
In the column Oxidation resistance: ○ = No oxidized layer observed; △ = Oxidized layer of less than 0.3 mm. in thickness; X = Oxidized layer of more than 0.3 mm. in thickness observed.

EXAMPLE 4

20 g. of beryllium oxide powder was thoroughly mixed with each of the additives as shown in Table 4. The mixture was cold pressed under a pressure of 1.0 ton/cm.$^2$, using a mold of 6 x 4 x 30 mm., to prepare each 5 pieces. The rods were fired in a vacuum sintering furnace at 1650° C. for 1 hour. The thus obtained samples were heated for 10 minutes in an electric furnace maintained at 1200° C., were quickly taken out and were quickly quenched in water. After repeating 3 times the above thermal cycle, the measurement of the bending strength of the rods was done in the same manner as in Example 1 to obtain the values as shown in Table 4.

TABLE 4

| Additive | Amount (wt. percent) | Bending strength (kg./cm.$^2$) | |
|---|---|---|---|
| | | Before test | After test (3 times' thermal cycle) |
| Titanium carbide | 0.1 | 2,150 | 50 |
| | 0.5 | 2,050 | 1,850 |
| | 5 | 2,050 | 2,000 |
| | 15 | 2,100 | 950 |
| | 20 | 1,900 | ¹0 |
| Titanium boride | 0.1 | 2,000 | 0 |
| | 0.5 | 1,950 | 1,300 |
| | 5 | 1,950 | 1,800 |
| | 15 | 2,050 | 1,100 |
| | 20 | 1,650 | 0 |
| Titanium silicide | 0.1 | 2,250 | 150 |
| | 0.5 | 2,100 | 1,900 |
| | 5 | 2,150 | 2,100 |
| | 15 | 2,000 | 1,750 |
| | 20 | 1,350 | 0 |

¹ Broken.

From the above results, it has been substantiated that the amount of the first additive to be added is preferably 0.5–15%.

EXAMPLE 5

Beryllium oxide power was mixed with each of the additives shown in Table 5. Each mixture thus obtained was cold pressed using a mold of 16 mm. in diameter and was fired in an argon atmosphere at 1600° C. for 1 hour. The resulting pellets were measured in porosity according to water displacement method. The results were as shown in Table 5.

TABLE 5

| Additive | Amount (wt. percent) | Porosity (after firing) (percent) |
|---|---|---|
| Niobium carbide | 10 | 7.5 |
| Niobium boride | 10 | 10.3 |
| Niobium silicide | 10 | 9.2 |
| Niobium carbide plus aluminum oxide | 10+5 | 0.4 |
| Niobium carbide plus zirconium | 10+5 | 0.7 |
| Niobium boride plus aluminum oxide | 10+5 | 0.6 |
| Niobium boride plus zirconium | 10+5 | 0.8 |
| Niobium silicide plus aluminum oxide | 10+5 | 0.3 |
| Niobium silicide plus zirconium | 10+5 | 0.6 |

As shown on the table, the pellets incorporated with only individual carbide, boride and silicide have not fully been fired at 1600° C. and require higher temperatures, whereas those further incorporated with the second additive have thoroughly been fired. From this, it is understood that the addition of the second component is markedly effective not only for the improvement in corrosion resistance of the beryllium oxide matrix but also for the lowering of firing temperature.

EXAMPLE 6

Each 20 g. of (ordinary) beryllium oxide powder and active (high purity) beryllium oxide were throughly mixed individually with each of the additives as shown in Table 6 and 20% of water. The thus obtained mixtures were individually cold pressed under a pressure of 1.4 ton/cm.$^2$, using a mold of 16 mm. in diameter, were dried at 100° C. for 12 hours were then fired for 1 hour at temperatures shown in Table 6 to obtain samples. On the other hand, beryllium oxide, magnesium oxide and aluminum oxide were individually molded in the same manner as above to prepare control samples.

Each of these samples was heated for 10 minutes in an electric furnace maintained at 1500° C., was quickly taken out and was quenched in 20 l. of water. This opera-

TABLE 6

| Additives | Amount (wt. percent) | 1 | 2 | 3 | 4 | 5 | 6 | 7 | 8 | 9 | 10 | Firing temperature |
|---|---|---|---|---|---|---|---|---|---|---|---|---|
| Ordinary BeO: | | | | | | | | | | | | |
| Tantalum silicide | 10 | O | X | | | | | | | | | 1,450° C., vacuum. |
| Tantalum silicide plus magnesium oxide | 10+1 | O | O | O | X | | | | | | | |
| Active BeO: | | | | | | | | | | | | |
| Tantalum silicide | 10 | O | O | O | O | △ | X | | | | | Do. |
| Tantalum silicide plus magnesium oxide | 10+1 | O | O | O | O | O | O | O | O | O | O | |
| Ordinary BeO: | | | | | | | | | | | | |
| Tantalum silicide | 10 | O | O | O | O | △ | X | | | | | 1,650° C., vacuum. |
| Tantalum silicide plus magnesium oxide | 10+1 | O | O | O | O | O | △ | X | | | | |
| Active BeO: | | | | | | | | | | | | |
| Tantalum silicide | 10 | O | O | O | O | O | O | O | △ | X | | Do. |
| Tantalum silicide plus magnesium oxide | 10+1 | O | O | O | O | O | △ | X | | | | |
| Control: | | | | | | | | | | | | |
| Beryllium oxide | 100 | X | | | | | | | | | | |
| Aluminum oxide | 100 | X | | | | | | | | | | Do. |
| Magnesium oxide | 100 | X | | | | | | | | | | |

NOTE.—In the table, "ordinary BeO" is a wording relative to "active BeO" and is identical with beryllium oxide referred to in Examples 1 to 5. The active BeO is such high purity beryllium oxide as disclosed in.

tion was repeated to judge the thermal shock resistance of each sample against water quenching. The results were as shown in Table 6. From the table, it is understood that the use of the active beryllium oxide makes it possible to obtain bodies higher in thermal shock resistance.

We claim:

1. A method of producing a beryllium oxide composite having a multi-phase structure of an oxide polycrystalline phase and a non-oxide crystal phase with a gap being formed between the two phases and between each oxide polycrystalline phase, said method comprising preparing a mixture consisting essentially of 0.5–15% by weight of at least one high melting carbide, boride or silicide selected from the group consisting of titanium, zirconium, niobium, tantalum, chromium, molybdenum, tungsten and vanadium, and silicon carbide, the remainder of the mixture being beryllium oxide, shaping the mixture and firing the shaped mixture to a temperature of 1700° C.

References Cited

UNITED STATES PATENTS

| 2,982,619 | 5/1961 | Long | 106—55 |
| 3,067,048 | 12/1962 | Gion | 106—55 |
| 3,165,417 | 11/1965 | Turner | 106—55 |
| 3,205,080 | 9/1965 | Ryshkewitch | 106—44 |

FOREIGN PATENTS

| 37/3,900 | 6/1962 | Japan | 106—63 |
| 39/26,066 | 11/1964 | Japan | 106—44 |
| 1,524,723 | 5/1968 | France | 106—55 |

JULIUS FROME, Primary Examiner

J. H. MILLER, Assistant Examiner

U.S. Cl. X.R.

106—44, 55; 264—332

UNITED STATES PATENT OFFICE
CERTIFICATE OF CORRECTION

Patent No. 3,564,086　　　　　　　　　　Dated February 16, 1971

Inventor(s) Susumu Nishigaki et al.

It is certified that error appears in the above-identified patent and that said Letters Patent are hereby corrected as shown below:

In the heading to the printed specification, after line 9, insert -- Claims priority application Japan, May 30, 1966, 41/34974; June 17, 1966, 41/39485 --.

Signed and sealed this 17th day of August 1971.

(SEAL)
Attest:

EDWARD M. FLETCHER, JR.　　　　　　　WILLIAM E. SCHUYLER, JR.
Attesting Officer　　　　　　　　　　Commissioner of Patents